United States Patent [19]

Stanley et al.

[11] 3,990,966

[45] Nov. 9, 1976

[54] FLOTATION PROCESS FOR PURIFYING CALCITE

[75] Inventors: Alan Stanley, Marietta; Thomas F. Deems, Cartersville, both of Ga.

[73] Assignee: Thompson-Weinman and Company, Cartersville, Ga.

[22] Filed: Apr. 4, 1975

[21] Appl. No.: 565,068

[52] U.S. Cl. .................................. 209/12; 209/166
[51] Int. Cl.² .......................................... B03B 7/00
[58] Field of Search ................ 209/166, 167, 3, 10, 209/12

[56] References Cited
UNITED STATES PATENTS

| | | | |
|---|---|---|---|
| 2,321,186 | 6/1943 | Christmann | 209/166 |
| 2,364,272 | 12/1944 | Christmann | 209/166 |
| 2,380,698 | 7/1945 | Jayne | 209/166 |
| 2,494,132 | 1/1950 | Jayne | 209/166 |
| 2,951,585 | 9/1960 | Burks | 209/167 |
| 2,959,281 | 11/1960 | Faucher | 209/166 X |
| 3,219,578 | 11/1965 | Cruickshank | 210/54 A |
| 3,418,237 | 12/1968 | Booth | 210/54 A |
| 3,492,226 | 1/1970 | Ryznar | 210/54 A |

Primary Examiner—Robert Halper
Attorney, Agent, or Firm—Nilsson, Robbins, Dalgarn & Berliner

[57] ABSTRACT

Calcite is separated and purified from mineral impurities by grinding calcite ore, separating calcite from the impurities by conditioning the ground ore with a cationic flotation reagent selected from the group consisting of 1-hydroxyethyl-2-heptadecenyl glyoxalidine and 1-hydroxyethyl-2-alkylimidazolines and salt derivatives thereof, wherein the alkyl portion of the imidazoline is the alkyl portion of a fatty acid, dry or wet classifying the separated calcite and, if wet, settling the classified calcite in a thickener in the presence of an anionic settling agent.

11 Claims, 1 Drawing Figure

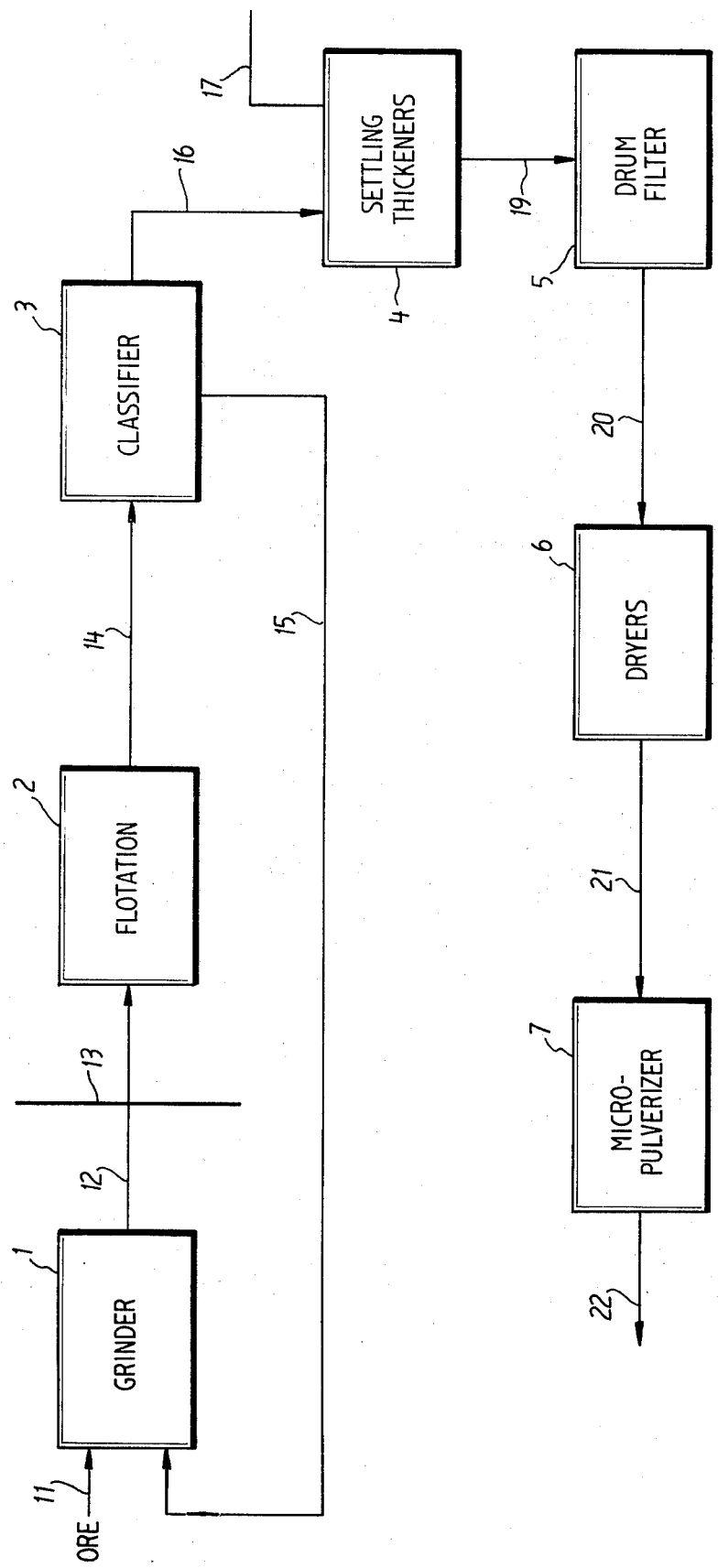

FLOTATION PROCESS FOR PURIFYING CALCITE

BACKGROUND OF THE INVENTION

1. Field of the Invention

The present invention relates to the separation of impurities from calcite ore. More particularly, the present invention relates to the flotation of calcite containing rock in the presence of a reagent which separates mineral impurities from calcite.

2. Description of the Prior Art

Calcite is normally separated from limestone rock by the well-known Thompson Weinman process in which the mineral bearing rock is first ground and then the ground material is subjected to flotation. To effect separation of calcite from mineral impurities, the ground ore is subjected to flotation in the presence of xanthate or a tallow amine reagent combination. A particular combination which has been used is a mixture of sodium sec-butyl xanthate (Xanthate 301) and an alcohol type material (MIBC methyl isobutyl carbinol) in amounts of 0.25 to 0.5 pound per ton of calcite ore to float pyrite impurity from the ore. As the type of ore from mine sources has changed with regard to the amount and compositional make-up of the impurities in the ore, problems of brightness and the percentage of insoluble impurities have increased. Consequently, the amounts of micaceous schist and silica have increased in the product calcite to the point where xanthate flotation is undesirable.

In order to overcome this disadvantage, other flotation reagents such as a combination of N-tallow-trimethylenediamine diacetate (Duomac T) and a tertiary amine having one fatty alkyl group and two polyoxyethylene groups attached to nitrogen (Ethomeen 18/60) have been used.

With this combination all of the insoluble impurities can be removed from the calcite rock, i.e., micaceous schist, pyrite and quartz. However, certain disadvantages exist in that the reagents are solid as they are received which consequently requires that the reagents have to be handled, weighed and dissolved in warm water before they can be used in the system. Normally, the reagents are first dissolved to form a 2% or a 4% solution. Also, Duomac-T is very corrosive and tends to promote rust of the iron and steel it contacts. The corrosion of iron and its sensitivity to heat creates a slight loss in the finished color and a browner tint in the calcite pigment. In addition, because Duomac-T is cationic, it causes the fine calcite in the system to disperse which creates difficulties in the settling of the finished products. Further, in a manner not completely understood, the reagent combination apparently adversely affects the grinding and classification of the calcite.

A need therefore, continues to exist for a method by which calcite can be efficiently separated from detrimental mineral impurities without the difficulties of handling and using the prior art surfactants, and without the corrosive properties of the prior art surfactants.

SUMMARY OF THE INVENTION

Accordingly, one object of the present invention is to provide a method for separating calcite from other mineral impurities.

Another object of the present invention is to provide a medium for the separation of calcite from impurities which is not corrosive to the separation system and which is easily handled.

Briefly, these objects and other objects of the invention as hereinafter will become more readily apparent can be attained by a process of separating and purifying mineral impurities from calcite, by grinding calcite ore, separating calcite from the impurities by conditioning the ground ore with a cationic surfactant selected from the group consisting of 1-hydroxyethyl-2-heptadecenyl glyoxalidine and 1-hydroxyethyl-2-alkylimidazolines and salt derivatives thereof, wherein the alkyl portion of the imidazoline is the alkyl portion of a fatty acid, classifying the separated calcite, settling the classified calcite in a thickener in the presence of a settling agent and drying the product. If a dry process is used in which dry grinding and classification steps are used following flotation the settling step employing the settling agent can be omitted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The FIGURE is a flow sheet of one embodiment of the process of the present invention in which limestone rock is converted to a purified calcite product.

DETAILED DESCRIPTION OF THE PREFERRED EMBODIMENTS

In the processing of calcite from mineral impurities by the Thompson Weinman process, particles of calcite ore of a size ranging up to 3 inches, preferably ½ inch to 3 inches, is ground in a grinding chamber. The types of ore used as the source of calcite are any of the common types of white limestone rock. The rock contains various silicate, micaceous mineral, sulfide mineral and pyrite impurities which are removed by the present process to achieve a product of 95+ brightness. Grinding of the limestone ore is normally accomplished by wet autogeneous grinding, although dry grinding can be accomplished in hammer mills, Raymond mills and ceramic type tube mills. Fresh rock is added to the grinding mills along with classifier rejects and water in quantities such that the desired flow rates and solids are maintained in the mills. When classifier rejects are recycled to the grinding mills, up to 85% rejects are recycled. The flow rate of material into the mills is a function of the mill size. If greater tonnages of calcite are desired, two or more Raymond roller mills can be used to increase the total output of ground calcite.

The discharged product from the wet grinding mills and the slurry product from the Raymond mill are combined and subjected to flotation. In the flotation step, the solids content of the flotation feed is usually maintained in the 20 to 40% range. Flotation is accomplished by adding a surface active agent to the slurry from the grinding mills. Usually, the temperature of the flotation bath ranges from 70° to 120° F. The improvement of the present invention resides in the finding that certain specific surface active agents overcome the disadvantages of the prior art surfactants. It was found that if flocculating agents such as epsom salts or alum were added to the normal Duomac-T and Ethomeen 18/60 flotation slurry, the settling problem created by the flotation step was solved. However, residual effects persisted in the finished calcite pigment which adversely affected the specific resistance. By residual effects are meant the amounts of soluble salts which are added to the calcite slurry prior to drying which remain with the calcite. Specific resistance is defined as the quantitative determination of the water soluble electrolyte content of the pigment. Consequently, the pigment was unsuitable for use in insulating materials.

In another approach to the settling problem, anionic surfactants such as, e.g., Ivory soap beads, were used. The use of soap not only enhanced settling, but also enhanced the flow and dispersion characteristics of the finished Atomite which is the name provided for one of the calcite products obtained from the classifier operation which follows the flotation step. The use of soap however, had the disadvantage that soap reacted with the tallow amine flotation reagent which resulted in the formation of a dark viscous froth on all of the settlers.

It has now been found that several cationic flotation agents which specifically include 1-hydroxyethyl-2-heptadecenyl glyoxalidine (known as Amine 220 — a tradename of Union Carbide) and 1-hydroxyethyl-2-alkylimidazolines and their salts wherein the alkyl portion is the alkyl portion of any fatty acid such as soybean oil, tall oil, and oleic acid. Preferred acids are tall oil and oleic acid (Monazoline O and T, respectively). The only limitation on the size of the alkyl portion of the fatty acid residue is that it must be short enough so that the flotation agent is liquid and not solid. The flotation agents are introduced into the flotation machine or conditioners, e.g., 6-Denver No. 50 DR flotation machines. The conditioners are of sufficient size to permit retention times from 1 to 10 minutes. The flotation process removes silicates, micaceous minerals, and sulfide minerals from the slurry and the material which is floated, or gangue, is discarded. After conditioning, the retention time of the calcite in the flotation cells may be between 2 and 10 minutes, preferably 5 minutes.

The purified slurry from the flotation step is then passed to the classification step where classifiers such as centrifugal Bird classifiers are used. In this step, depending upon the speed of the classifier, the slurry is made into Atomite, Snowflake or Duramite. These terms represent different classifications of calcite according to particle size where 50% of the particles of Atomite are less than 2.5 microns, 50% of the particles of Snowflake are less than 5.0 microns and 50% of the particles of Duramite are less than 10.0 microns.

The three calcite products (Atomite, Snowflake, Duramite) have the following specifications for classification.

|  | Atomite | Snowflake | Duramite |
| --- | --- | --- | --- |
| Minus 15 microns | 100 | 92 | 75 |
| Minus 2.5 microns | 50 | 30 | 13 |

This type of classification is standard in the industry. The calcite pigments are used as fillers.

It is possible to use both Atomite and Snowflake rejects as feed to a Duramite classifier. The coarse rejects from Duramite classifiers and other sources, if desired, can be recycled to the feed of the autogeneous mills for regrinding.

After classification, the classified product is screened to remove residual matter and then passed to thickeners. In the thickening step, a dilute slurry of water and calcite is passed into the center of the thickener. The concentration of the calcite in the slurry fed to the thickener is not critical, but usually ranges from 5-40%, preferably about 10%. In the thickeners, the slurry is allowed to stand and calcite settles by gravity. The underflows pumped from the bottom contain 40-60% Atomite, 50-65% Snowflake and 50-65% Duramite, while the overflows contain 0.5-1.5% solids. The overflows are recycled to wherever process water is required.

The amounts of thickened slurry can vary in the thickener. If a flocculating agent is not used in this step, the overflow solids would increase to the 5% range. Since a classified product is used as a feed to the thickener, and since the finest fractions end in the overflow, if the overflow solids are allowed to rise, the underflow becomes coarse and the resultant underflow is devoid of calcite fines. Consequently, the product calcite does not meet product specifications. Without the use of a flocculant, best settling takes place at 110°-120° F. In the presence of a flocculant, the temperatures can drop to 75°-85° F and still yield effective settling. For the thickeners, the classified product is combined with a settling agent which can be anionic surfactant or soap to promote settling. The settling agent is used because the flotation agents are so effective at dispersing the calcite, that a settling agent becomes necessary. Suitable settling agents employed include low titer soaps such as Ivory soap beads, high titer soaps such as Saratoga chips, dioctyl sodium sulfosuccinate (Triton-GB-5), an ammonical solution of partially esterified styrenemaleic anhydride copolymer (SMA), sodium salt of polymeric carboxylic acid (Tamol 731), sodium salt of a polymerized carboxylic acid (Daxad 30), Percol 725 and alkyl aryl sulfonates. It must be emphasized that a wide variety of settling agents can be used, because no anionic settling agents have been found which do not work in the present invention. Ivory beads are the preferred surfactant and are preferably used as beads instead of in liquid form because they dissolve very easily. Furthermore, since liquid soap contains water and because large amounts of soap are used, the expense of shipping large amounts of water is eliminated by using solid soap. Soaps having a greater titer than Ivory soap should not be used because, while they are effective as settling agents, they have poor side effects within the plant. Normally, the settling agent is used in amounts ranging from 0.015 to 0.15 lbs per ton of calcite. Ivory soap beads are preferably used as the settling agent because they not only help the settling process, but also improve the final pigment dispersion. The Ivory beads are usually added as a 0.2% solution to the thickener feed. The addition of the beads in amounts of 0.01 to 0.08% lowers the thickener overflow from 3-10% range to as low as a trace. The overflow from the thickeners containing about 1.0-1.5% solids is returned as process water. An additional benefit of the slight flocculation is that the pigment properties in polyesters is improved. The settling agent enhances the finished Atomite properties and does not create a froth problem in the settling tanks.

The underflow from the thickeners is passed onto driers where it is dried at a temperature from 280°-370° F. The Atomite goes to a spray drier and the dried Atomite is micropulverized twice to break up agglomerates formed during drying and conveyed to bulk storage where it is bagged or set onto bulk shipments. The Snowflake and Duramite are dried, micropulverized once and packaged for shipment.

In the described Thompson Weinman process, when dry grinding and classification steps follow the flotation step, the settling agent need not be used because the thickener operation can be omitted. In the dry plant process, the product from the flotation step is dried before final grinding and classification. The product is dried at a temperature just sufficient to evaporate water, usually 150°–250° F.

The FIGURE shows a preferred embodiment of the Thompson Weinman process in which limestone ore is passed through line 11 to grinder 1. After grinding, the ore is passed through line 12 to flotation unit 2, and the flotation agents are added to the flotation unit through line 13. After flotation, the calcite slurry is passed through line 14 to classifier 3. Coarse rejects from the classifier are recycled to the autogeneous mill for further grinding through line 15. The classified products from the classifiers are then passed through line 16 to thickeners 4. Settling agents are added to the slurry in the thickeners through line 17. The overflow from the thickeners is removed via line 18 and returned to the process. The underflow slurry from the thickener is passed through line 19 optionally to drum filter 5. After filtration, the product is passed through line 20 to dryer 6 and the dried calcite is passed through line 21 to micropulverizer 7. The final product is bagged for shipment after ejection from the micropulverizer through line 22. The advantages gained by the flotation and flocculating agents in the present process are:

1. Each of the flotation agents replaces the prior art combination of surface active agents.
2. The flotation reagents of the present invention require only one-half the cell capacity.
3. The calcite slurry from flotation enhances grinding and classification.
4. A series of settling agents which neutralize the dispersing characteristics of cation flotation reagents and in addition yield a better dispersing and flowable product.
5. The flotation agents of the present invention are liquid and are not solids which must be combined and dissolved in a solution.

The calcite product obtained from the separation and purification process is used as a filler and pigment for paints, paper, plastics and adhesives.

Having generally described this invention, a further understanding can be obtained by reference to certain specific examples which are provided herein for purposes of illustration and are not intended to be limiting unless otherwise specified.

COMPARATIVE EXAMPLES 1 and 2

The following data compares the results obtained by the two most commonly used flotation systems in the separation of calcite from mineral impurities. The table below shows the brightness, tint and percent insolubles of the ore particles before flotation and after processing of the ore.

The trace amount of material in the thickener overflow when the Xanthate flotation agent is used indicates that settling was not a problem before the Armak reagents (Duomac-T and Ethomeen 18/60) were required. In other words, settling of the calcite particles was excellent when Xanthate was used.

The finished Hegman texture of the product obtained is a measure of the dispersion of Atomite in a vehicle as determined by a Hegman guage. The Hegman guage is a wedge that is calibrated from 0 to 8 wherein increasingly higher numbers represent a finer particle size. The Hegman guage is a standard measuring device in the pigment industry.

Brightness is defined as the percent reflectance of light from the pigment using a green filter. Tint is defined as the reflectance difference between an amber and blue filter of a sample. Brightness and tint values were determined on a Gardner Multi-purpose Reflectometer (NO. RG-4860).

|  | Xanthate[3] | Duomac 1[4] Ethomeen 18/60 |
|---|---|---|
| Float Feed, % Solids | 40 ± 10 | 40 ± 10 |
| Brightness[1] | 93.5 ± 0.5 | 94.3 ± 0.3 |
| Tint[1] | 1.3 ± 0.3 | 1.0 ± 0.3 |
| % Insolubles[2] | 2.5 ± 0.5 | 1.0 ± 0.5 |
| Float Product % Solids | 40 ± 10 | 40 ± 10 |
| Brightness[1] | 93.7 ± 0.5 | 94.9 ± 0.3 |
| Tint[1] | 1.2 ± 0.3 | 1.3 ± 0.2 |
| % Insolubles[2] | 2.4 ± 0.5 | 0.8 ± 0.5 |
| Thickener Overflow, % Solids | Trace | 3–10% |
| Finished Hegman Texture | 4.5–5.5 | 3.5–4.5 |
| Final Brightness and tint | 94.0 ± 2 | 95.3 ± .2 |
|  | 1.5 ± 2 | 1.5 ± .2 |

1. Brightness and tint measured on a Hunter Reflectometer Model RD-4860
2. Insolubles are minerals not dissolved in HCl. Because of the nature of the system the insolubles reported are affected by recirculating loads. If flotation is working, the feed and discharge insolubles are both low. Thus, this figure shows efficiency of flotation and not nature of new rock.
3. Xanthate 301 at 0.2 lbs./T and Frother MIBC.
4. Duomac-T at 0.2 lbs./T and Ethomeen 18/60 at 0.1 lbs./T.

COMPARATIVE EXAMPLE 3 AND EXAMPLE 1

The following data compares the results obtained from the process of separating and purifying calcite in which the foremost flotation system of the prior art and the preferred cationic flotation reagent of the present invention are shown. The advantages gained by using the present cationic reagent over the combination of the prior art is that a liquid is used instead of two solids, the tint of the product is better, grinding and classification are better, and less cells are needed.

| Float Feed | Duomac-T .2 lbs./T Ethomeen 18/60 0.05 lbs./T | Amine 220 0.15 lbs./T |
|---|---|---|
| % Solids | 40 ± 10 | 40 ± 10 |
| Brightness | 94.3 ± 0.3 | 94.3 ± 0.3 |
| Tint | 1.0 ± 0.3 | 1.0 ± 0.3 |
| % Insolubles | 1.0 ± 0.5 | 1.0 ± 0.5 |
| Float Product | Duomac-T .2 lbs./T Ethomeen 18/60 0.05 lbs./T | Amine 220 0.15 lbs./T |
| % Solids | 40 ± 10 | 40 ± 10 |
| Brightness | 94.9 ± 0.3 | 94.9 ± 0.3 |
| Tint | 1.3 ± 0.2 | 1.1 ± 0.2 |

-continued

| | | |
|---|---|---|
| % Insolubles | 0.8 ± 0.5 | 0.8 ± 0.5 |
| Thickener Overflow | | |
| % Solids before anion | 3 – 10 | 5 – 15 |
| % Solids after anion | 1.2 ± 0.3 | 1.2 ± 0.3 |
| Finished Hegman Texture | | |
| Before anion | 4.0 ± 0.5 | 4.0 ± 0.5 |
| After anion | 5.0 ± 0.5 | 5.0 ± 0.5 |
| Finished Brightness | 95.3 ± 0.2 | 95.3 ± 0.2 |
| Finished Tint | 1.5 ± 0.2 | 1.3 ± 0.2 |

COMPARATIVE EXAMPLE 4 and EXAMPLE 2

The following data compares the process in which Duomac-T 0.2 lbs./T, Ethomeen 18/60 0.05 lbs./T (Armour) and Amine 220 are used as flotation agents in the separation process. The heat sensitivity data shows that calcite, when subjected to heat of drying is less sensitive to Amine 220. This is another advantage gained by using the present flotation reagent. The classification data indicates that Amine 220 is as good as the conventional reagents for the calcite which is classified besides its other advantages. The % solids data show that Amine 220 does not cause dispersion as strongly as the conventional reagents.

| | | | 9. Insolubles | FLOTATION Loss Calcite | pH | Brightness | Tint | |
|---|---|---|---|---|---|---|---|---|
| ARMOUR | product | 96.0 | .04 | — | 7.8 | 96.6 | 1.5 | Duomac-T .20 lbs./T |
| | gangue | 4.0 | 35.00 | 2.6 | | | | Ethomeen 18/60 |
| | feed | 100.0 | 1.44 | — | | | | .05 lbs./T |
| AMINE 220 | product | 96.8 | .14 | — | 7.8 | 96.8 | 1.0 | Amine 220 |
| | gangue | 3.2 | 40.8 | 1.9 | | | | |
| | feed | 100.0 | 1.44 | | | | | |

HEAT SENSITIVITY

Each product heated 10 minutes at 600° F

| | G[1] | A[2] | B[3] | Tint |
|---|---|---|---|---|
| Armour | 96.6 | 96.6 | 95.1 | 1.5 |
| Armour Heated | 96.5 | 96.4 | 95.3 | 1.1 |
| Amine 220 | 96.8 | 96.8 | 95.8 | 1.0 |
| Amine 220 Heated | 96.8 | 96.8 | 96.0 | .8 |

[1]G = green filter on reflectometer
[2]A = amber filter on reflectometer
[3]B = blue filter on reflectometer Floated products centrifuged to 800 rpm and stopped portion of fines analyzed

| | Armour | Amine 220 |
|---|---|---|
| % Solids | 11.0 | 11.0 |
| −15 | 99.6 | 99.6 |
| −10 | 96.0 | 96.0 |
| −2.5 | 38.0 | 38.0 |

SETTLING
% Solids in supernatant after hours

| Armour | Amine 220 |
|---|---|
| 2.0 | 0.0 |

HEGMAN
Finished Product

| Armour | Amine 220 |
|---|---|
| 4.5 | 4.5 |

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a wet process for purifying calcite ore containing pyrite impurities by grinding and forming a slurry of calcite ore, separating said impurities from the calcite slurry by flotation of the impurities therefrom in the presence of a flotation agent, classifying the resultant calcite slurry, settling the classified calcite in a thickener and drying the product, the improvement which comprises:

using as said flotation agent a cationic surfactant selected from the group consisting of (a) 1-hydroxyethyl-2-heptadecenyl glyoxalidine, (b) 1-hydroxyethyl-2-alkylimidazolines and (c) salt derivatives of said imidazoline, wherein the alkyl portion of the imidazoline is the alkyl portion of a fatty acid of such length that said surfactant is liquid.

2. The process of claim 1, wherein said cationic surfactant is combined with calcite in amounts of 0.1 to 0.5 lbs per ton of calcite ore.

3. The process of claim 1, wherein said cationic surfactant is 1-hydroxyethyl-2-heptadecenyl glyoxalidine.

4. The process of claim 1, wherein said settling agent is used in amounts of 0.015 lbs per ton of calcite ore.

5. The process of claim 1, wherein said alkyl portion is the alkyl portion of oleic acid or tall oil.

6. The process of claim 1 in which said classified calcite is settled in said thickener in the presence of an anionic salt surfactant.

7. The process of claim 6 in which said anionic surfactant is added to said process only subsequently to said flotation.

8. In a dry process for purifying calcite ore containing pyrite impurities by grinding and forming a slurry of calcite ore, separating impurities from the calcite slurry by flotation of the impurities therefrom in the presence of a flotation agent, drying the slurry and dry grinding and classifying the resultant calcite, the improvement which comprises:

using as said flotation agent a cationic surfactant selected from the group consisting of (a) 1-hydroxyethyl-2-heptadecenyl glyoxalidine, (b) 1-hydroxyethyl-2-alkylimidazolines and (c) salt derivatives of said imidazoline, wherein the alkyl portion of the imidazoline is the alkyl portion of a fatty acid of such length that said surfactant is liquid.

9. The process of claim 8, wherein said alkyl portion is the alkyl portion of oleic acid or tall oil.

10. The process of claim 8, wherein said cationic surfactant is 1-hydroxyethyl-2-heptadecenyl glyoxalidine.

11. The process of claim 10, wherein said cationic surfactant is combined with calcite in amounts of 0.1 to 0.5 lbs. per ton of calcite ore.

UNITED STATES PATENT AND TRADEMARK OFFICE
CERTIFICATE OF CORRECTION

PATENT NO. : 3,990,966
DATED : November 9, 1976
INVENTOR(S) : Alan Stanley and Thomas F. Deems It is certified that error appears in the above-identified patent and that said Letters Patent are hereby corrected as shown below:

Column 7, line 59 before "hours" insert --3.5--.

Signed and Sealed this

Fifteenth Day of February 1977

[SEAL]

Attest:

RUTH C. MASON
*Attesting Officer*

C. MARSHALL DANN
*Commissioner of Patents and Trademarks*